US009077965B2

United States Patent
Wu et al.

(10) Patent No.: US 9,077,965 B2
(45) Date of Patent: Jul. 7, 2015

(54) METHOD AND APPARATUS FOR PERFORMING LOSSY IMAGE COMPRESSION THROUGH SOURCE QUANTIZATION AND LOSSLESS COMPRESSION KERNEL, AND RELATED METHOD AND APPARATUS FOR IMAGE DECOMPRESSION

(71) Applicant: MEDIATEK INC., Hsin-Chu (TW)

(72) Inventors: Tung-Hsing Wu, Chiayi (TW); Han-Liang Chou, Hsinchu County (TW); Kun-Bin Lee, Taipei (TW); Chi-Cheng Ju, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 27 days.

(21) Appl. No.: 14/049,229

(22) Filed: Oct. 9, 2013

(65) Prior Publication Data

US 2014/0105514 A1  Apr. 17, 2014

Related U.S. Application Data

(60) Provisional application No. 61/712,955, filed on Oct. 12, 2012.

(51) Int. Cl.
*G06K 9/36* (2006.01)
*H04N 19/194* (2014.01)
*H04N 19/176* (2014.01)
*H04N 19/124* (2014.01)
*H04N 19/127* (2014.01)
*H04N 19/146* (2014.01)

(52) U.S. Cl.
CPC ....... *H04N 19/00363* (2013.01); *H04N 19/176* (2014.11); *H04N 19/124* (2014.11); *H04N 19/127* (2014.11); *H04N 19/146* (2014.11); *H04N 19/194* (2014.11)

(58) Field of Classification Search
CPC ............... H04N 19/0009; H04N 19/00363; H04N 19/00569; H04N 19/00575; H04N 19/00721; H04N 19/124; H04N 19/127; H04N 19/132; H04N 19/14; H04N 19/146; H04N 19/176; H04N 19/184; H04N 19/194; G06T 9/00; G06T 9/004; G06T 9/007; H04L 47/38; H04L 69/04
See application file for complete search history.

(56) References Cited

U.S. PATENT DOCUMENTS 6,980,695 B2 * 12/2005 Mehrotra .................. 382/244
6,999,628 B2 *  2/2006 Simard et al. ............. 382/238

(Continued)

FOREIGN PATENT DOCUMENTS

CN       102098507 A    6/2011
WO    2012080713 A1    6/2012

OTHER PUBLICATIONS

"International Search Report" mailed on Jan. 16, 2014 for International application No. PCT/CN2013/085143, International filing date: Oct. 12, 2013.

*Primary Examiner* — Jose Couso
(74) *Attorney, Agent, or Firm* — Winston Hsu; Scott Margo

(57) ABSTRACT

An image compression method has at least the following steps: receiving source pixel data of a plurality of blocks of a frame; when a lossless compression mode is enabled for the frame, bypassing a source quantization operation and applying a lossless compression kernel to source pixel data of each of the blocks; and when a lossy compression mode is enabled for the frame, applying the source quantization operation to the source pixel data of each of the blocks to generate input pixel data of each of the blocks, and applying the lossless compression kernel to the input pixel data of each of the blocks. For example, the source quantization operation employs an adaptive quantization parameter for each of the blocks such that a size of compressed data of the frame generated under the lossy compression mode does not exceed a bit budget.

29 Claims, 9 Drawing Sheets

(56) References Cited

U.S. PATENT DOCUMENTS

| | | |
|---|---|---|
| 8,064,517 B1 | 11/2011 | Viscito |
| 2008/0170626 A1 | 7/2008 | Sung |
| 2014/0044370 A1* | 2/2014 | Odagiri .......................... 382/238 |
| 2014/0177710 A1* | 6/2014 | Komi et al. .............. 375/240.12 |
| 2014/0219558 A1* | 8/2014 | Teng et al. .................... 382/166 |

* cited by examiner

METHOD AND APPARATUS FOR PERFORMING LOSSY IMAGE COMPRESSION THROUGH SOURCE QUANTIZATION AND LOSSLESS COMPRESSION KERNEL, AND RELATED METHOD AND APPARATUS FOR IMAGE DECOMPRESSION

CROSS REFERENCE TO RELATED APPLICATIONS

This application claims the benefit of U.S. provisional application No. 61/712,955, filed on Oct. 12, 2012 and incorporated herein by reference.

BACKGROUND

The disclosed embodiments of the present invention relate to image compression, and more particularly, to a method and apparatus for performing lossy image compression through source quantization (which is bypassed in lossless image compression) and a lossless compression kernel (which is also used in lossless image compression), and related method and apparatus for image decompression.

An image compression operation may employ either a lossless compression algorithm or a lossy compression algorithm. When the lossless compression algorithm is used by a transmitting end to encode source pixel data into encoded bit-stream data, the reconstructed pixel data derived from decoding the encoded bit-stream data at a receiving end should be identical to the source pixel data. When the lossy compression algorithm is used by a transmitting end to encode source pixel data into encoded bit-stream data, the reconstructed pixel data derived from decoding the encoded bit-stream data at a receiving end may not be identical to the source pixel data. With regard to the lossy compression, several functions may involve lossy operations. For example, the transformation stage, entropy coding stage and residue quantization stage may be implemented using lossy operations.

If the transmitting end is required to support both of lossless compression and lossy compression for a particular application, one conventional design of the transmitting end may have one image compressor dedicated to performing the lossless compression and another image compressor dedicated to performing the lossy compression. However, such an image compression design is not cost-effective.

SUMMARY

In accordance with exemplary embodiments of the present invention, a method and apparatus for performing lossy image compression through source quantization (which is bypassed in lossless image compression) and a lossless compression kernel (which is also used in lossless image compression) and related method and apparatus for image decompression are proposed.

According to a first aspect of the present invention, an exemplary image compression method is disclosed. The exemplary image compression method includes: receiving source pixel data of a plurality of blocks of a frame; when a lossless compression mode is enabled for the frame, bypassing a source quantization operation and applying a lossless compression kernel to source pixel data of each of the blocks; and when a lossy compression mode is enabled for the frame, applying the source quantization operation to the source pixel data of each of the blocks to generate input pixel data of each of the blocks, and applying the lossless compression kernel to the input pixel data of each of the blocks.

According to a second aspect of the present invention, an exemplary image compression method is disclosed. The exemplary image compression method includes: receiving source pixel data of a plurality of blocks of a frame; and performing a lossy compression upon the frame by applying a source quantization operation to the source pixel data of each of the blocks to generate input pixel data of each of the blocks, and applying a lossless compression kernel to the input pixel data of each of the blocks. The source quantization operation employs an adaptive quantization parameter for each of the blocks.

According to a third aspect of the present invention, an exemplary image compressor is disclosed. The exemplary image compressor includes an input port, a source quantization unit and a lossless compression kernel. The input port is arranged for receiving source pixel data of a plurality of blocks of a frame. The source quantization unit is arranged for performing a source quantization operation. The lossless compression kernel is arranged for performing a lossless compression. When a lossless compression mode is enabled for the frame, the source quantization unit bypasses source pixel data of each of the blocks to the lossless compression kernel, and the lossless compression kernel performs the lossless compression upon the source pixel data of each of the blocks. When a lossy compression mode is enabled for the frame, the source quantization unit applies the source quantization operation to the source pixel data of each of the blocks to generate input pixel data of each of the blocks to the lossless compression kernel, and the lossless compression kernel performs the lossless compression upon the input pixel data of each of the blocks.

According to a fourth aspect of the present invention, an exemplary image compressor is disclosed. The exemplary image compressor includes an input port, a source quantization unit and a lossless compression kernel. The input port is arranged for receiving source pixel data of a plurality of blocks of a frame. The source quantization unit is arranged for applying a source quantization operation to the source pixel data of each of the blocks to generate input pixel data of each of the blocks, wherein the source quantization operation unit employs an adaptive quantization parameter for each of the blocks. The lossless compression kernel is arranged for performing a lossless compression upon the input pixel data of each of the blocks.

According to a fifth aspect of the present invention, an exemplary image decompression method is disclosed. The exemplary image decompression method includes: receiving compressed pixel data of a plurality of blocks of a frame; when a lossless decompression mode is enabled for the frame, applying a lossless decompression kernel to compressed pixel data of each of the blocks, and bypassing an output inverse quantization operation; and when a lossy decompression mode is enabled for the frame, applying a lossless decompression kernel to compressed pixel data of each of the blocks to generate output pixel data of each of the blocks, and applying the output inverse quantization operation to the output pixel data of each of the blocks.

According to a sixth aspect of the present invention, an exemplary image decompression method is disclosed. The exemplary image decompression method includes: receiving compressed pixel data of a plurality of blocks of a frame; applying a lossless decompression kernel to compressed pixel data of each of the blocks to generate output pixel data of each of the blocks; and applying an output inverse quantization operation to the output pixel data of each of the blocks.

The output inverse quantization operation employs an adaptive quantization parameter for each of the blocks.

According to a seventh aspect of the present invention, an exemplary image decompressor is disclosed. The exemplary image decompressor includes an input port, a lossless decompression kernel and an output inverse quantization unit. The input port is arranged for receiving compressed pixel data of a plurality of blocks of a frame. The lossless decompression kernel is arranged for performing a lossless decompression. The output inverse quantization unit is arranged for performing an output inverse quantization operation. When a lossless decompression mode is enabled for the frame, the lossless decompression kernel performs the lossless decompression upon compressed pixel data of each of the blocks to generate output pixel data of each of the blocks, and the output inverse quantization unit bypasses the output pixel data of each of the blocks. When a lossy decompression mode is enabled for the frame, the lossless decompression kernel performs the lossless decompression upon the compressed pixel data of each of the blocks to generate the output pixel data of each of the blocks, and the output inverse quantization unit performs the output inverse quantization upon the output pixel data of each of the blocks.

According to an eighth aspect of the present invention, an exemplary image decompressor is disclosed. The exemplary image decompressor includes an input port, a lossless decompression kernel and an output inverse quantization unit. The input port is arranged for receiving compressed pixel data of a plurality of blocks of a frame. The lossless decompression kernel is arranged for performing a lossless decompression upon compressed pixel data of each of the blocks to generate output pixel data of each of the blocks. The output inverse quantization unit is arranged for performing an output inverse quantization operation upon the output pixel data of each of the blocks. The output inverse quantization unit employs an adaptive quantization parameter for each of the blocks.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes a universal image compressor which supports a lossless compression mode and a lossy compression by using a hardware sharing technique. Specifically, a lossless compression kernel used for lossless compression is reused in the lossy compression. Thus, the proposed universal image compressor is able to switch between lossless compression and lossy compression by controlling whether or not source quantization (i.e., a pixel distortion function) immediately preceding a lossless compression function is bypassed. In this way, the proposed universal image compressor has a flexible configuration for both lossless compression and lossy compression, and minimizes the implementation effort for different kinds of compression designs. Besides, the present invention also proposes a universal image decompressor which supports a lossless decompression mode and a lossy decompression by using a hardware sharing technique. Further details of the proposed universal image compressor and universal image decompressor are described as below.

Figure 1:
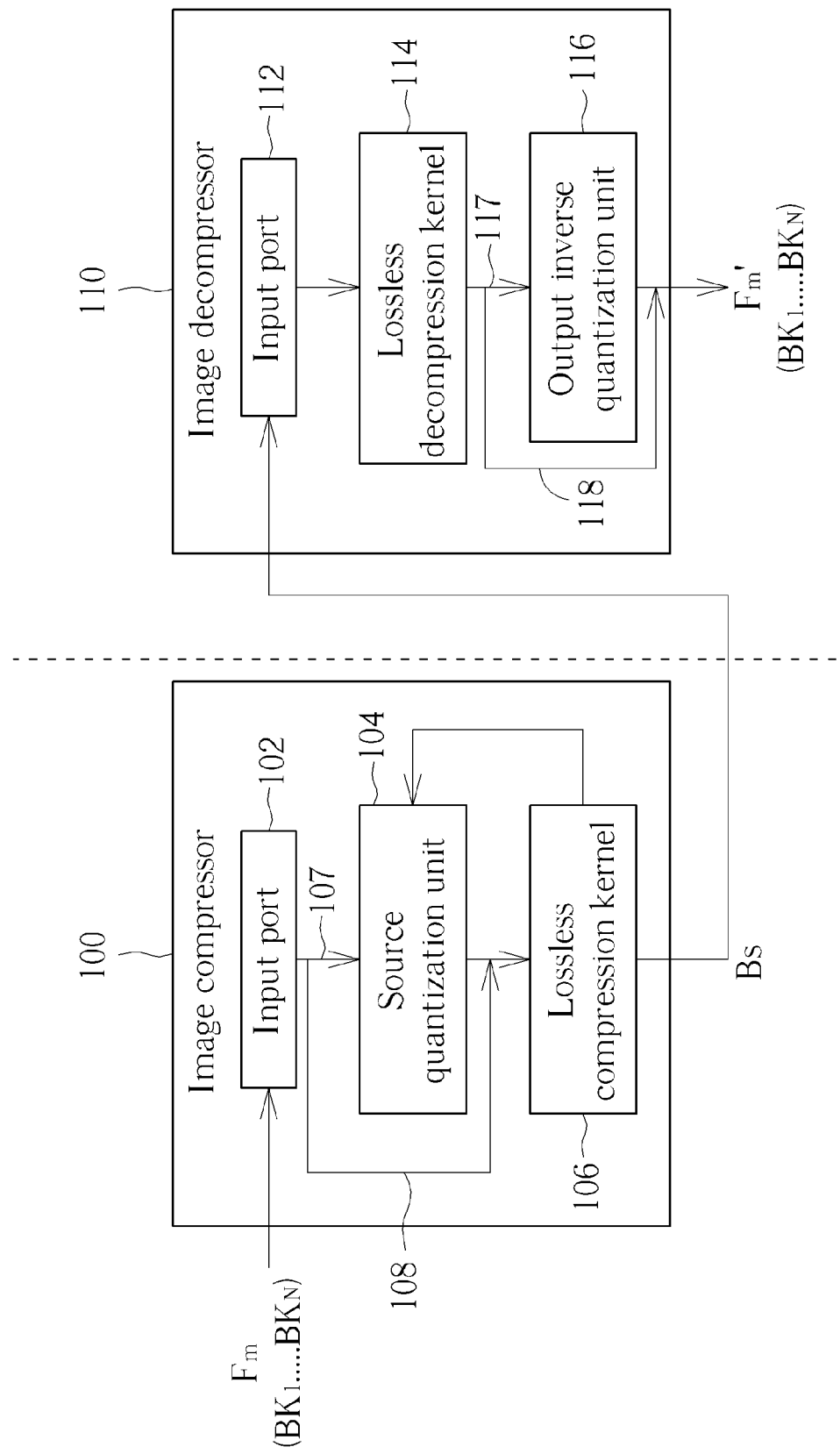
FIG. 1 is a diagram illustrating an image compressor and an image decompressor according to an embodiment of the present invention.

FIG. 1 is a diagram illustrating an image compressor and an image decompressor according to an embodiment of the present invention. The image compressor 100 is located at a transmitting end TX, and arranged to encode/compress source pixel data of a plurality of blocks $BK_1$-$BK_N$ of a frame Fm into a bit-stream Bs composed of a plurality of encoded/compressed pixel data of the blocks $BK_1$-$BK_N$. The bit-stream Bs is transmitted from the transmitting end TX to a receiving end RX for further processing, where the image decompressor 110 is located at the receiving end RX. Several exemplary applications using the proposed image compressor 100 and image decompressor 110 are illustrated in FIGS. 2-4 for illustrative purposes.

Figure 2:
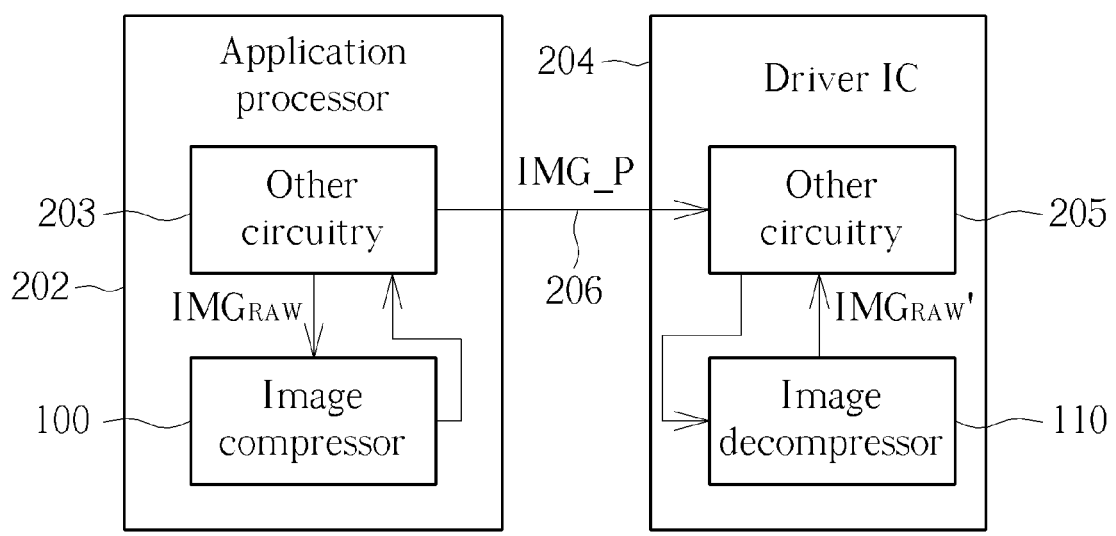
FIG. 2 is a diagram illustrating a first application which using the proposed image compressor and image decompressor shown in FIG. 1.

FIG. 2 is a diagram illustrating a first application which using the proposed image compressor 100 and image decompressor 110. An application processor 202 includes the image compressor 100 and other circuitry 203. The other circuitry 203 generates a raw image $IMG_{RAW}$ to the image compressor 100. The other circuitry 203 may apply pixel processing to the raw image $IMG_{RAW}$ before outputting the raw image $IMG_{RAW}$. The image compressor 100 is coupled to the other circuitry 203, and performs lossy/lossless image compression upon the raw image $IMG_{RAW}$ to generate a compressed/encoded image IMG_P, where the compressed/encoded image IMG_P is transmitted to a display interface 206 through the other circuitry 203. Next, the application processor 202 transmits the compressed/encoded image IMG_P to a driver integrated circuit (IC) 204 via the display interface 206. For example, the display interface 206 may be a display serial interface (DSI) standardized by a Mobile Industry Processor Interface (MIPI) or an embedded display port (eDP) standardized by a Video Electronics Standards Association (VESA).

The image decompressor 110 receives the compressed/encoded image IMG_P from the display interface 206, and then transmits the compressed/encoded image IMG_P to the image decompressor 110 through other circuitry 205. The image decompressor 110 performs lossy/lossless decompression upon the compressed/encoded image IMG_P to recover a raw image $IMG_{RAW'}$, and transmits the raw image $IMG_{RAW'}$ to the other circuitry 205 for further processing. If a lossless compression algorithm is employed by the image compressor 100, the raw image $IMG_{RAW'}$ generated from a corresponding lossless decompression algorithm would be identical to the raw image $IMG_{RAW}$. However, if a lossy compression algorithm is employed by the image compressor 100, the raw image $IMG_{RAW'}$ generated from a corresponding lossy decompression may not be identical to the raw image $IMG_{RAW}$. Compared to transmitting the raw image $IMG_{RAW}$ over the display interface 206 directly, transmitting the compressed/encoded image IMG_P over the display interface 206 has a smaller data size/lower data rate. Hence, the power consumption of the display interface 206 is reduced correspondingly. Besides, the buffer requirement of the driver IC 204 may be relaxed.

Figure 3:
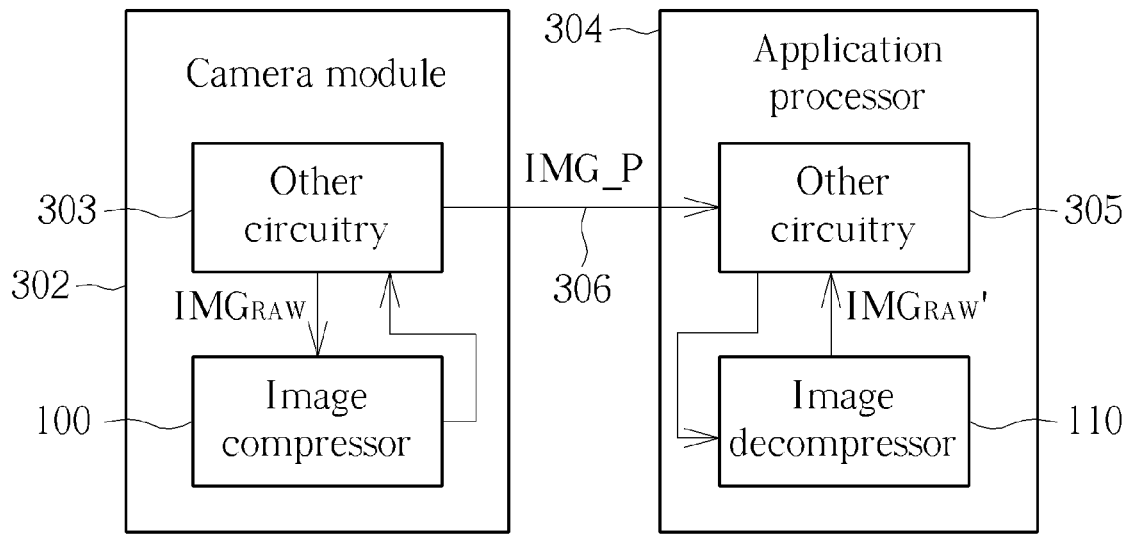
FIG. 3 is a diagram illustrating a second application which using the proposed image compressor and image decompressor shown in FIG. 1.
Figure 4:
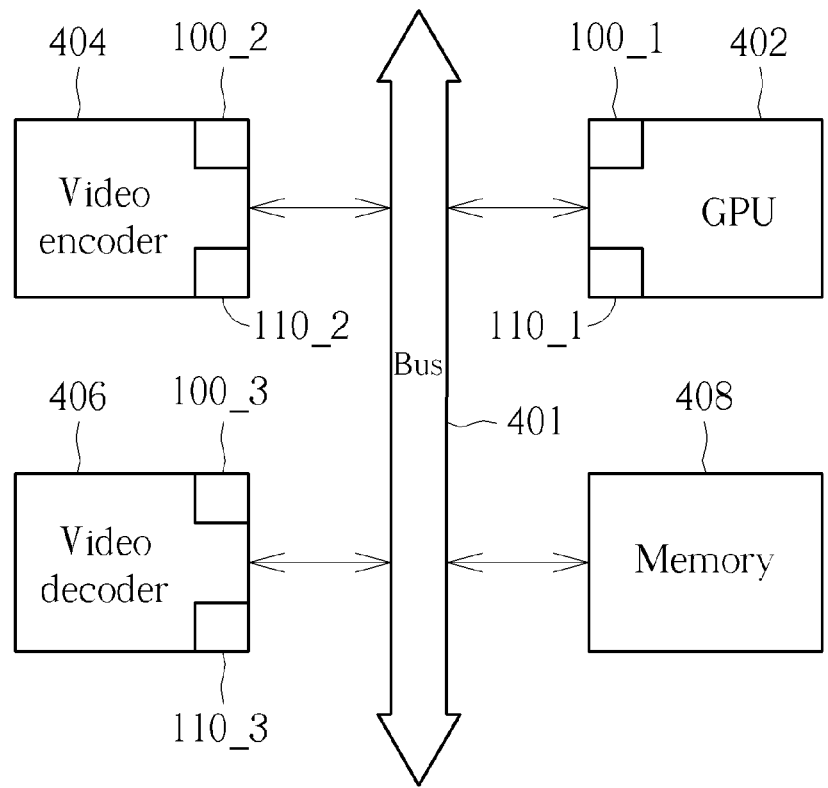
FIG. 4 is a diagram illustrating a third application which using the proposed image compressor and image decompressor shown in FIG. 1.

FIG. 3 is a diagram illustrating a second application which using the proposed image compressor 100 and image decompressor 110. A camera module 302 includes the image compressor 100 and other circuitry 303. The other circuitry 303 is coupled to the image compressor 100, and generates a raw image $IMG_{RAW}$ to the image compressor 100. The other circuitry 303 may apply pixel processing to the raw image $IMG_{RAW}$ before outputting the raw image $IMG_{RAW}$. The image compressor 100 is coupled to the other circuitry 303, and performs lossy/lossless image compression upon the raw image $IMG_{RAW}$ to generate a compressed/encoded image IMG_P, where the compressed/encoded image IMG_P is transmitted to a camera interface 306 through the other circuitry 303. Next, the camera module 302 transmits the compressed/encoded image IMG_P to an application processor 304 via the camera interface 306. For example, the camera interface 306 may be a camera serial interface (CSI) standardized by a Mobile Industry Processor Interface (MIPI).

The application processor 304 receives the compressed/encoded image IMG_P from the camera interface 306, and then transmits the compressed/encoded image IMG_P to the image decompressor 110 through other circuitry 305. The image decompressor 110 performs lossy/lossless decompression upon the compressed/encoded image IMG_P to recover a raw image $IMG_{RAW'}$, and transmits the raw image $IMG_{RAW'}$ to the other circuitry 305 for further processing. If a lossless compression algorithm is employed by the image compressor 100, the raw image $IMG_{RAW'}$ generated from a corresponding lossless decompression algorithm would be identical to the raw image $IMG_{RAW}$. However, if a lossy compression algorithm is employed by the image compressor 100, the raw image $IMG_{RAW'}$ generated from a corresponding lossy decompression may not be identical to the raw image $IMG_{RAW}$. Similarly, compared to transmitting the raw image $IMG_{RAW}$ over the camera interface 306 directly, transmitting the compressed/encoded image IMG_P over the camera interface 306 has a smaller data size/lower data rate. Hence, the power consumption of the camera interface 306 is reduced correspondingly. Besides, the buffer requirement of the application processor 304 may be relaxed.

FIG. 4 is a diagram illustrating a third application which using the proposed image compressor 100 and image decompressor 110. In this embodiment, at least one proposed image compressor and at least one proposed image decompressor are employed by a graphics platform having, for example, a graphics processing unit (GPU) 402, a video encoder 404, a video decoder 406 and a memory 408. The GPU 402, video encoder 404, video decoder 406 and memory 408 communicate with one another through a bus 401. Each of the GPU 402, video encoder 404 and video decoder 406 is equipped with an image compressor 100_1/100_2/100_3 implemented using the proposed image compressor 100 shown in FIG. 1, and is further equipped with an image decompressor 100_1/100_2/100_3 implemented using the proposed image decompressor 110 shown in FIG. 1. As compressed/encoded images generated from the image compressors 100_1-100_3 are transmitted through the bus 501, the bandwidth of the bus 501 can be reduced. Besides, the decoder-side buffer requirement can be relaxed. Regarding the image decompressor 100_1/100_2/100_3, it is arranged to obtain a reconstructed image by applying lossy/lossless image decompression to the compressed/encoded image received from the bus 401.

Further details directed to using the image compressor 100 to generate a bit-stream composed of encoded/compressed pixel data are described as follows. Please refer to FIG. 1 again. The image compressor 100 includes an input port 102, a source quantization unit 104 and a lossless compression kernel 106. The input port 102 is arranged for receiving source pixel data of blocks $BK_1$-$BK_N$ of one frame Fm. The source quantization unit 104 is arranged for performing a source quantization operation (e.g., a pixel distortion operation). The lossless compression kernel 106 is arranged for performing lossless compression. In this embodiment, an output of the input port 102 may be directly processed by the source quantization through the first path 107 or directly processed by the lossless compression through the second path (e.g., a bypass path) 108. More specifically, when a lossless compression mode is enabled for the frame Fm, the source quantization unit 104 bypasses source pixel data of each of the blocks $BK_1$-$BK_N$ to the lossless compression kernel 106 without applying any pixel distortion to the source pixel data, and the lossless compression kernel 106 performs the lossless compression upon the source pixel data of each of the blocks $BK_1$-$BK_N$ to thereby generate the bit-stream Bs; and when a lossy compression mode is enabled for the frame Fm, the source quantization unit 104 is actuated to perform the source quantization operation upon the source pixel data of each of the blocks $BK_1$-$BK_N$ to generate input pixel data of each of the blocks $BK_1$-$BK_N$ to the lossless compression kernel 106, and the lossless compression kernel 106 performs the lossless compression upon the input pixel data of each of the blocks $BK_1$-$BK_N$ (i.e., the pixel distortion result generated by the source quantization unit 104) to thereby generate the bit-stream Bs.

Figure 5:
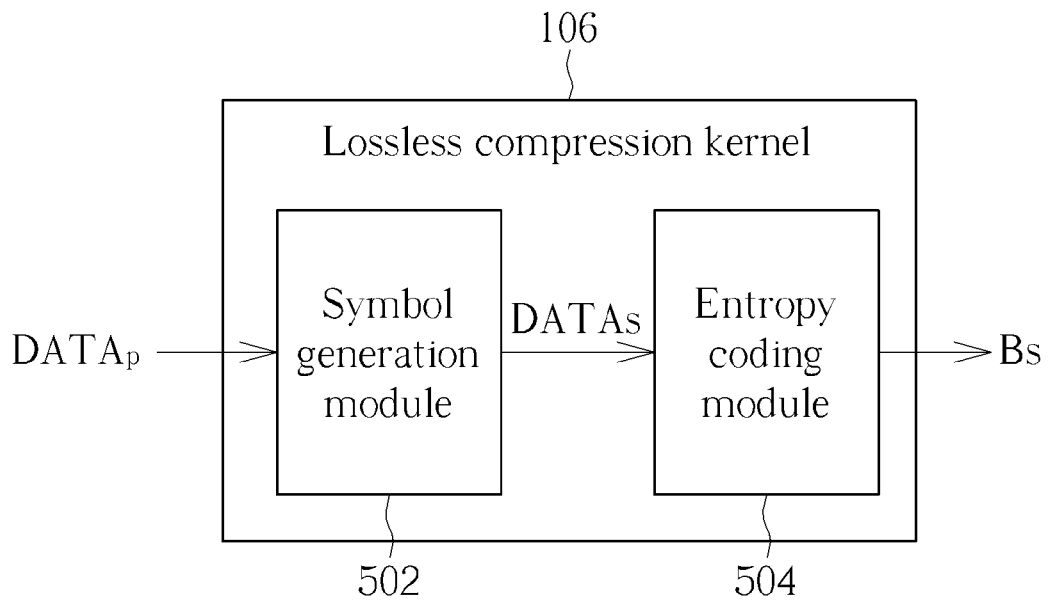
FIG. 5 is a diagram illustrating an exemplary design of the lossless compression kernel shown in FIG. 1.

As can be seen from FIG. 1, the lossless compression kernel 106 is used under the lossless compression mode, and is reused under the lossy compression mode. Please refer to FIG. 5, which is a diagram illustrating an exemplary design of the lossless compression kernel 106 shown in FIG. 1. The lossless compression kernel 106 includes a symbol generation module 502 and an entropy coding module 504. The symbol generation module 502 is arranged to perform a lossless symbol generation function. Hence, the symbol generation module 502 receives pixel data $DATA_P$ from a preceding circuit element, either the input port 102 or the source quantization unit 104. The symbol generation module 502 performs lossless symbol generation to convert the received pixel data $DATA_P$ into symbol data $DATA_S$. By way of example, the lossless symbol generation function may be implemented using lossless spatial prediction, lossless frequency transformation, or lossless temporal prediction. The entropy coding module 504 is coupled to the symbol generation module 502, and arranged to perform a lossless entropy coding function. Hence, the entropy coding module 504 receives the symbol data $DATA_S$, and apply lossless entropy coding to the symbol data $DATA_S$ to generate the bit-stream Bs composed of encoded/compressed data. In a case where a lossless decompression kernel corresponding to the lossless compression kernel 106 is implemented in a receiving end, the reconstructed symbol data derived from the bit-stream Bs would be identical to the symbol data $DATA_S$, and the reconstructed pixel data derived from the reconstructed symbol data would be identical to the pixel data $DATA_P$.

The source quantization unit 104 is actuated only when the lossy compression mode is enabled. As the lossless compression kernel 106 introduces no distortion, the source quantization unit 104 is responsible for introducing desired distortion for achieving lossy compression. In this embodiment, the source quantization unit 104 employs an adaptive quantization parameter for each of the blocks $BK_1$-$BK_N$. That is, the source quantization unit 104 may employ different quantization parameters $QP_{BK1}$-$QP_{BKN}$ when processing source pixel data of the blocks $BK_1$-$BK_N$. In one exemplary design, the source quantization may be implemented using a dynamic bit truncation operation. However, this is for illustrative purposes only, and is not meant to be a limitation of the present invention. That is, in an alternative design, other pixel distortion methodology may be adopted by the source quantization. This also falls within the scope of the present invention.

Figure 6:
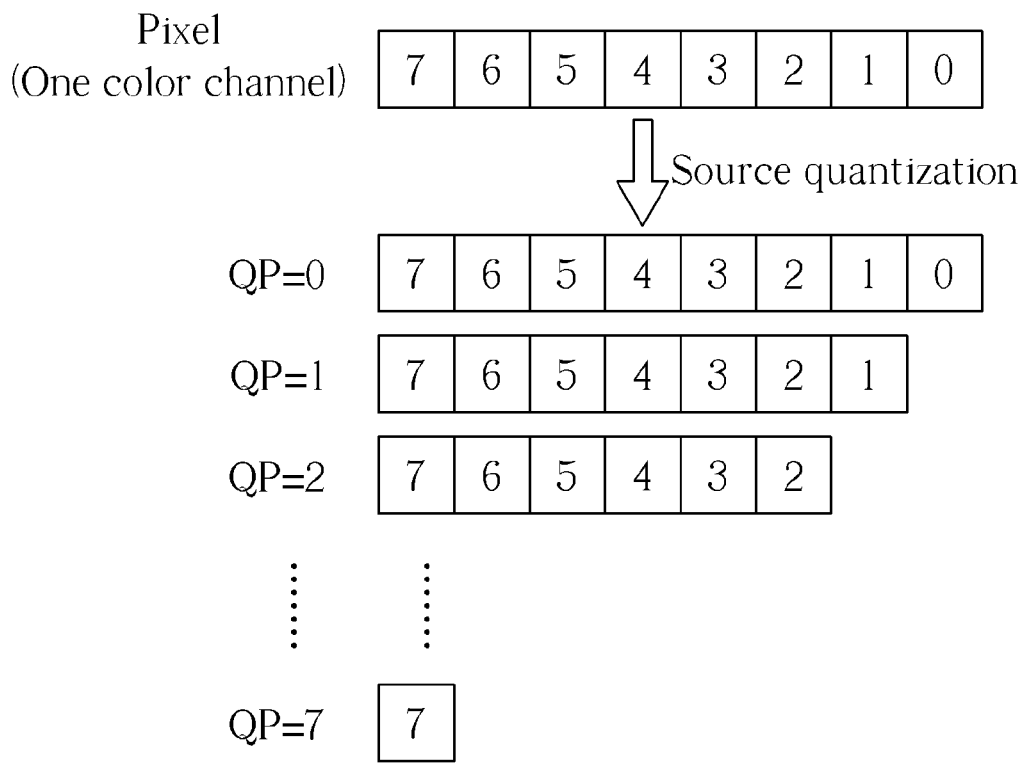
FIG. 6 is a diagram illustrating an example of the source quantization performed by the source quantization unit shown in FIG. 1.

Please refer to FIG. 6, which is a diagram illustrating an example of the source quantization performed by the source quantization unit 104. The number of bits truncated by the source quantization is a variable value which depends on the quantization parameter (QP). Suppose that a pixel has multiple color channels (e.g., RGB channels or YUV channels) and each color channel data of the pixel has N bits. In this example, N=8. When the quantization parameter is set by 0, no bit truncation is performed upon each color channel data (i.e., the bit truncation is bypassed). Hence, each color channel data of the pixel generated from the source quantization unit 104 still has N bits. When the quantization parameter is set by 1, a 1-bit truncation is performed upon each color channel data. Hence, each color channel data of the pixel generated from the source quantization unit 104 has (N−1) bits. When the quantization parameter is set by 2, a 2-bit truncation is performed upon each color channel data. Hence, each color channel data of the pixel generated from the source quantization unit 104 has (N−2) bits. When the quantization parameter is set by 7, a 7-bit truncation is performed upon each color channel data. Hence, each color channel data of the pixel generated from the source quantization unit 104 has (N−7) bits. To put it simply, when the quantization parameter is set by a larger value, more pixel distortion is introduced by the source quantization. However, this is for illustrative purposes only, and is not meant to be a limitation of the present invention. That is, any bit truncation design which adjusts the number of truncated bits based on the adaptive quantization parameter may be employed for realizing the source quantization.

As mentioned above, due to the use of the adaptive quantization parameter, the number of bits of each block to be processed by the lossless compression kernel 106 may be adjusted. In this way, the number of bits of each encoded block generated from the lossless compression kernel 106 may be adjusted/controlled through the source quantization. Therefore, adaptive quantization parameters $QP_{BK1}$-$QP_{BKN}$ of the blocks $BK_1$-$BK_N$ may be properly set by the source quantization unit 104 to make a size of compressed data of a plurality of blocks (e.g., the whole frame Fm or each of slices in the frame Fm) generated under the lossy compression mode not exceed a bit budget $TH_{BB}$. In this embodiment, the image compressor 100 sets the bit budget $TH_{BB}$ before encoding the frame Fm, where the bit budget $TH_{BB}$ may be adjusted, depending upon application requirement and/or decoding capability of an image decompressor. For each of the blocks $BK_1$-$BK_N$, the source quantization unit 104 determines a selected quantization parameter among a plurality of candidate quantization parameters (e.g., QP=0, QP=1 . . . QP=7), where encoded data generated from the source quantization using the selected quantization parameter and the following lossless compression acts as a compression result of the block and becomes part of the bit-stream Bs.

Figure 7:
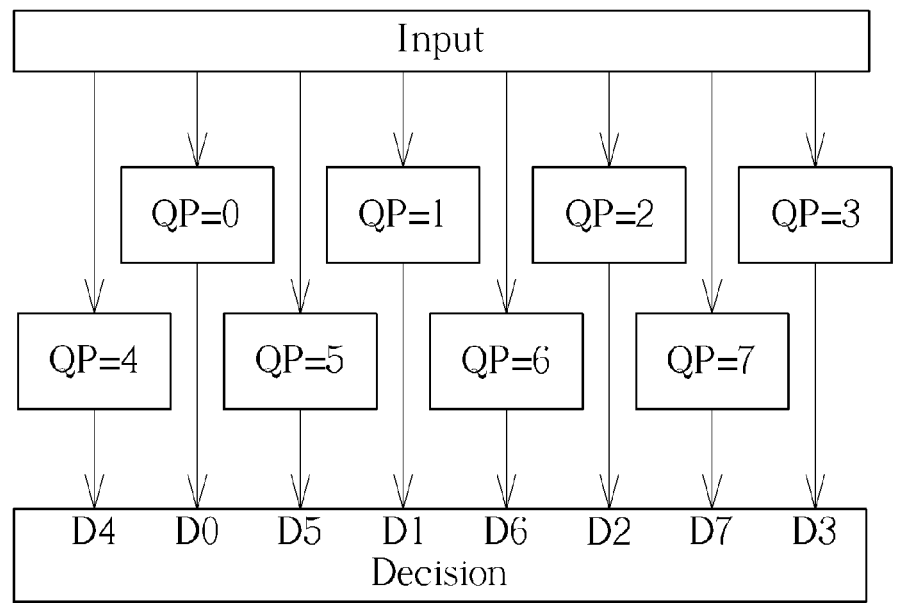
FIG. 7 is a diagram illustrating an example of testing all candidate quantization parameters by using a full quantization parameter search.
Figure 8:
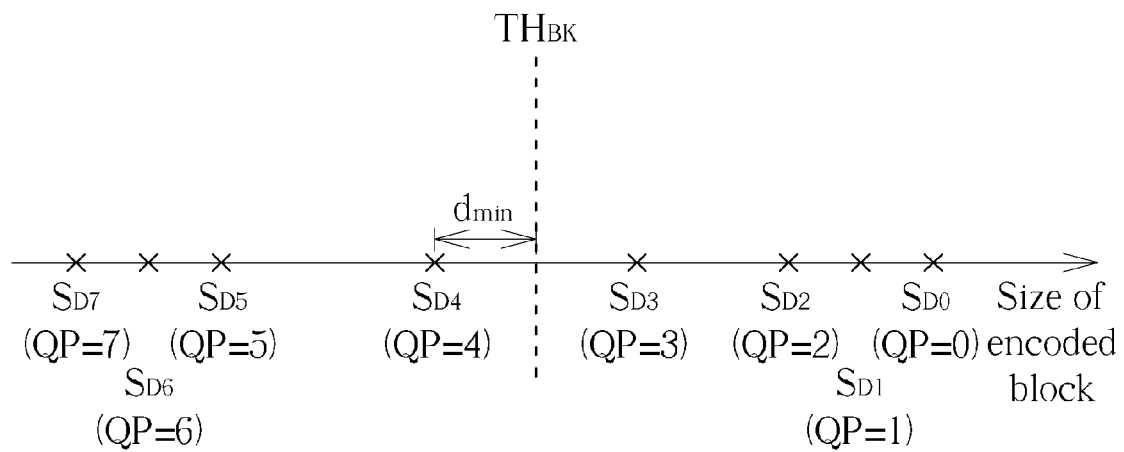
FIG. 8 is a diagram illustrating a decision made by the source quantization unit based on the full quantization parameter search.

To determine the selected quantization parameter (i.e., a target quantization parameter) for each block, the source quantization unit 104 may employ one of a full quantization parameter search, a binary quantization parameter search, a one-pass quantization parameter search and a multi-pass quantization parameter search. Please refer to FIG. 7 in conjunction with FIG. 8. FIG. 7 is a diagram illustrating an example of testing all candidate quantization parameters by using a full quantization parameter search. FIG. 8 is a diagram illustrating a decision made by the source quantization unit 104 based on the full quantization parameter search. When the full quantization parameter search is employed by the source quantization unit 104, all of the candidate quantization parameters (e.g., QP=0, QP=1 . . . QP=7) are tested to generate input pixel data of a current block to the lossless compression kernel 106, respectively. As a result, compressed data of the same block (e.g., D0-D7) are obtained by the lossless compression kernel 106, where the compressed data D0-D7 correspond to the candidate quantization parameters (e.g., QP=0, QP=1 . . . QP=7), respectively. Hereinafter, assume that the bit budget $TH_{BB}$ is applied to the whole frame Fm. Hence, the size of compressed data of the frame Fm generated under the lossy compression mode should not exceed the bit budget $TH_{BB}$ for each frame. As the frame Fm is partitioned into multiple blocks $BK_1$-$BK_N$, bit budgets $TH_{BK1}$-$TH_{BKN}$ of respective blocks $BK_1$-$BK_N$ should satisfy the following formula.

$$TH_{BK1}+TH_{BK2}+\ldots+TH_{BKN} \leq TH_{BB} \quad (1)$$

It should be noted that bit budgets $TH_{BK1}$-$TH_{BKN}$ of respective blocks $BK_1$-$BK_N$ are not necessarily the same.

The size S of compressed data of each of the blocks $BK_1$-$BK_N$ generated under the lossy compression mode is required to meet a corresponding bit budget requirement (i.e., $S \leq TH_{BK}$, where $TH_{BK}$ is a bit budget of a current block). Hence, a candidate quantization parameter which makes corresponding compressed data of the current block have a size meeting the bit budget requirement and have a minimum distortion induced by the source quantization operation meeting the bit budget requirement is identified as the selected quantization parameter. As shown in FIG. 8, each of the candidate quantization parameters QP=4, QP=5, QP=6, QP=7 is capable of making corresponding compressed data D4/D5/D6/D7 of the current block have a size $S_{D4}/S_{D5}/S_{D6}/S_{D7}$ meeting the bit budget requirement; besides, among all of the candidate quantization parameters QP=4, QP=5, QP=6, QP=7, the candidate quantization parameter QP=4 makes corresponding compressed data D4 have a minimum distortion $d_{min}$ induced by the source quantization operation meeting the bit budget requirement. Thus, the source quantization unit 104 decides that the selected quantization parameter of the current block should be QP=4. Next, the lossless compression kernel 106 discards the compressed data D0-D3 and D5-D7, and outputs the compressed data D4 to serve as a compression result of the current block.

Figure 9:
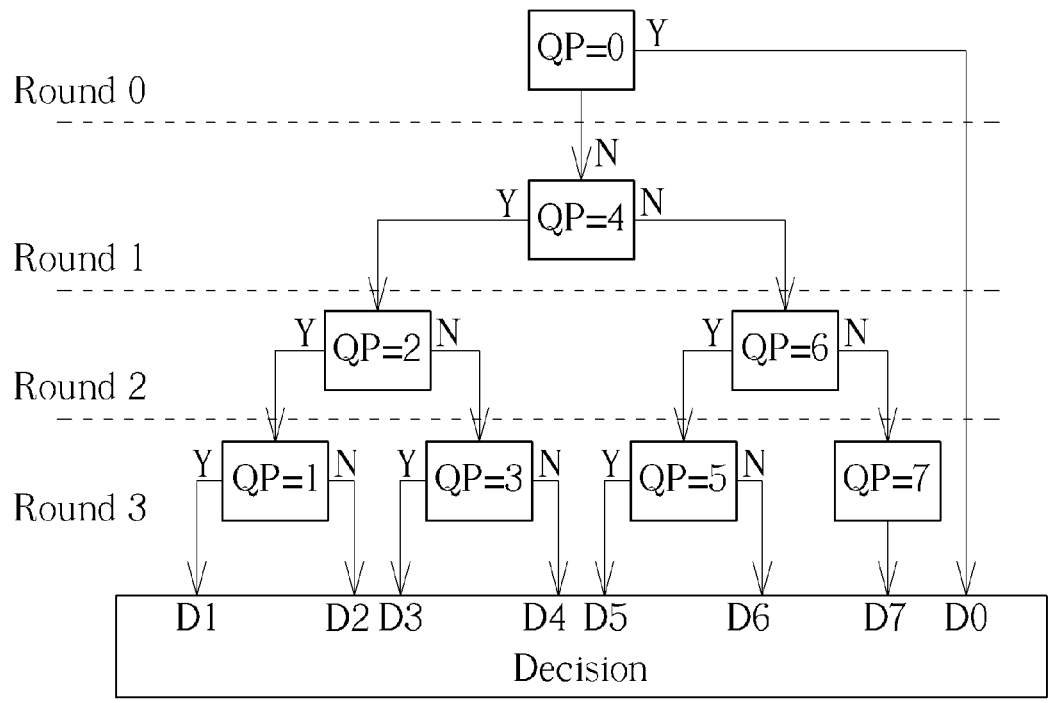
FIG. 9 is a diagram illustrating an example of testing a portion of candidate quantization parameters by using a binary quantization parameter search.
Figure 10:
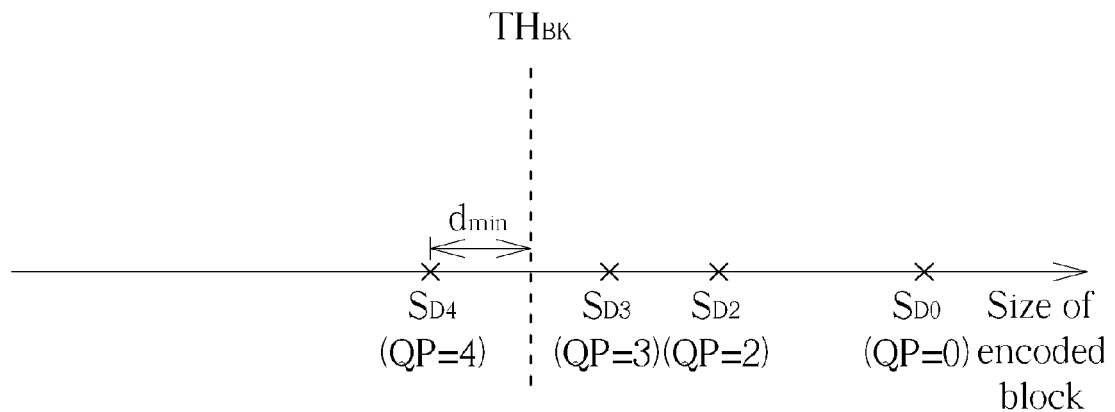
FIG. 10 is a diagram illustrating a decision made by the source quantization unit based on the binary quantization parameter search.

Please refer to FIG. 9 in conjunction with FIG. 10. FIG. 9 is a diagram illustrating an example of testing a portion of candidate quantization parameters by using a binary quantization parameter search. FIG. 10 is a diagram illustrating a decision made by the source quantization unit 104 based on the binary quantization parameter search. When the binary quantization parameter search is employed by the source quantization unit 104, not all of the candidate quantization parameters (e.g., QP=0, QP=1 . . . QP=7) are tested. That is, only a portion of the candidate quantization parameters are used for generating input pixel data of a current block, respectively. If M is the total number of the candidate quantization parameters, only $\lceil \log_2 M \rceil$ or $\lfloor \log_2 M \rfloor$ candidate quantization parameters are used for compressed size estimation. In this example, M is equal to 8, and at most 4 candidate quantization parameters are tested. As mentioned above, since the frame Fm is partitioned into multiple blocks $BK_1$-$BK_N$, the size S of compressed data of each of the blocks $BK_1$-$BK_N$ generated under the lossy compression mode is required to meet a bit budget requirement (i.e., $S \leq TH_{BK}$, where $TH_{BK}$ is a bit budget of a current block). Hence, a candidate quantization parameter which makes corresponding compressed data of the block have a size meeting the bit budget requirement and have a minimum distortion induced by the source quantization operation meeting the bit budget requirement is identified as the selected quantization parameter.

As shown in FIG. 9, the candidate quantization parameter QP=0 is tested first. If the corresponding compressed data D0 of the current block has a size $S_{D0}$ meeting the bit budget requirement (i.e., $S_{D0} \leq TH_{BK}$), the candidate quantization parameter QP=0 would also make the compressed data D0 have a minimum distortion induced by the source quantization operation since no bit truncation is performed. Thus, the source quantization unit 104 directly identifies the candidate quantization parameter QP=0 as the selected quantization parameter, and the lossless compression kernel 106 outputs the compressed data D0 to serve as a compression result of the current block. However, if the compressed data D0 fails to meet the bit budget requirement (i.e., $S_{D0} > TH_{BK}$), the next candidate quantization parameter QP=4 is tested. When the compressed data D4 meets the bit budget requirement (i.e., $S_{D4} \leq TH_{BK}$), the next candidate quantization parameter QP=2 is tested. When the compressed data D4 fails to meet the bit budget requirement (i.e., $S_{D4} > TH_{BK}$), the next candidate quantization parameter QP=6 is tested. As a person skilled in the art can readily understand the test sequence of quantization parameters based on FIG. 9, further description is omitted for brevity.

Briefly summarized, the candidate quantization parameter QP=0 is identified as the selected quantization parameter when $S_{D0} \leq TH_{BK}$; the candidate quantization parameter QP=1 is identified as the selected quantization parameter when $S_{D0} > TH_{BK}$, $S_{D4} \leq TH_{BK}$, $S_{D2} \leq TH_{BK}$ and $S_{D1} \leq TH_{BK}$; the candidate quantization parameter QP=2 is identified as the selected quantization parameter when $S_{D0} > TH_{BK}$, $S_{D4} \leq TH_{BK}$, $S_{D2} \leq TH_{BK}$ and $S_{D1} > TH_{BK}$; the candidate quantization parameter QP=3 is identified as the selected quantization parameter when $S_{D0} > TH_{BK}$, $S_{D4} \leq TH_{BK}$, $S_{D2} > TH_{BK}$ and $S_{D3} \leq TH_{BK}$; the candidate quantization parameter QP=4 is identified as the selected quantization parameter when $S_{D0} > TH_{BK}$, $S_{D4} \leq TH_{BK}$, $S_{D2} > TH_{BK}$ and $S_{D3} > TH_{BK}$; the candidate quantization parameter QP=5 is identified as the selected quantization parameter when $S_{D0} > TH_{BK}$, $S_{D4} > TH_{BK}$, $S_{D6} \leq TH_{BK}$ and $S_{D5} \leq TH_{BK}$; the candidate quantization parameter QP=6 is identified as the selected quantization parameter when $S_{D0} > TH_{BK}$, $S_{D4} > TH_{BK}$, $S_{D6} \leq TH_{BK}$ and $S_{D5} > TH_{BK}$; and the candidate quantization parameter QP=7 is identified as the selected quantization parameter when $S_{D0} > TH_{BK}$, $S_{D4} > TH_{BK}$ and $S_{D6} > TH_{BK}$;

Consider the same condition shown in FIG. 8 that the value of $TH_{BK}$ is between $S_{D3}$ and $S_{D4}$. As can be seen from FIG. 10, the candidate quantization parameters QP=0, QP=4, QP=2 and QP=3 would be tested, sequentially. As $S_{D0} > TH_{BK}$, $S_{D4} \leq TH_{BK}$, $S_{D2} > TH_{BK}$ and $S_{D3} > TH_{BK}$, the candidate quantization parameter QP=4 makes corresponding compressed data D4 of the current block have a minimum distortion $d_{min}$ induced by the source quantization operation meeting the bit budget requirement. Thus, the source quantization unit 104 decides that the selected quantization parameter for the current block should be QP=4. Next, the lossless compression kernel 106 discards the compressed data D0, D2 and D3, and outputs the compressed data D4 to serve as a compression result of the current block.

Figure 11:
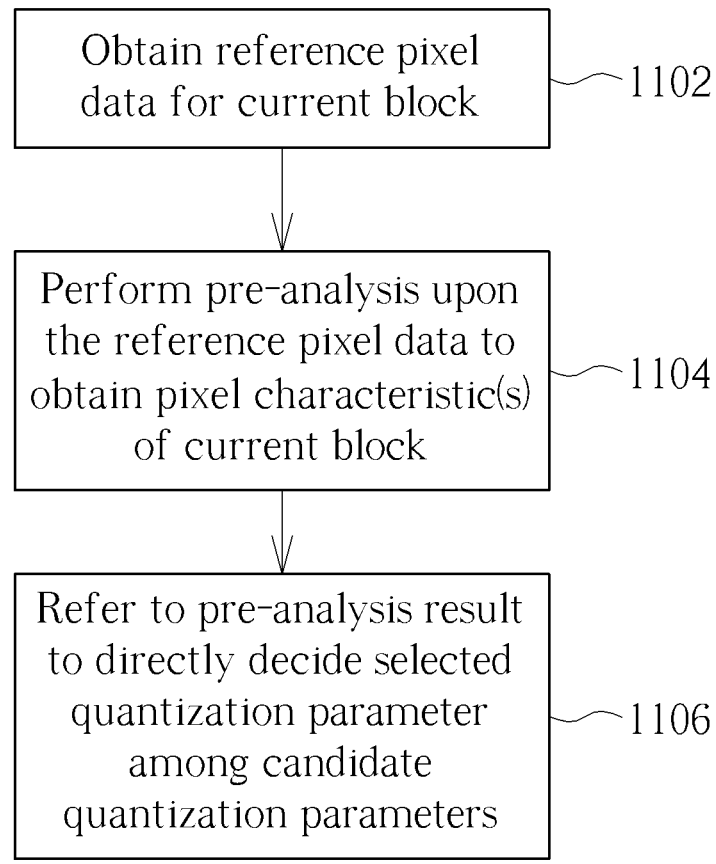
FIG. 11 is a flowchart illustrating a method of determining a selected quantization parameter for a block by using a one-pass quantization parameter search.

FIG. 11 is a flowchart illustrating a method of determining a selected quantization parameter for a block by using a one-pass quantization parameter search. In step 1102, the source quantization unit 104 obtains reference pixel data for a current block. For example, the reference pixel data may be the source pixel data of the current block or encoded pixel data of a previous block. In step 1104, the source quantization unit 104 performs pre-analysis upon the reference pixel data to obtain pixel characteristic (s). For example, the pixel characteristic(s) may include at least one of the following information: variance, frequency response, residue after spatial prediction, residue after frequency transformation, and quantization error after quantization process with a pre-defined set of quantization parameters. In step 1106, the source quantization unit 104 refers to the pixel characteristic(s) (i.e., the pre-analysis result) to directly decide the selected quantization parameter among the candidate quantization parameters. It is possible that the compressed data of the current data fails to meet the aforementioned bit budge requirement due to an incorrect quantization parameter predicted using the one-pass quantization parameter search. When the one-pass quantization parameter search is performed upon another block, the compressed data of the previous block is analyzed. In this way, the selected quantization parameter of a current block can be adjusted based on the previous encoding result to thereby reduce the mismatch between the compressed data size and an expected value. The same objective of making a size of compressed data of each frame generated under the lossy compression mode not exceed the predetermined bit budget $TH_{BB}$ is achieved.

Figure 12:
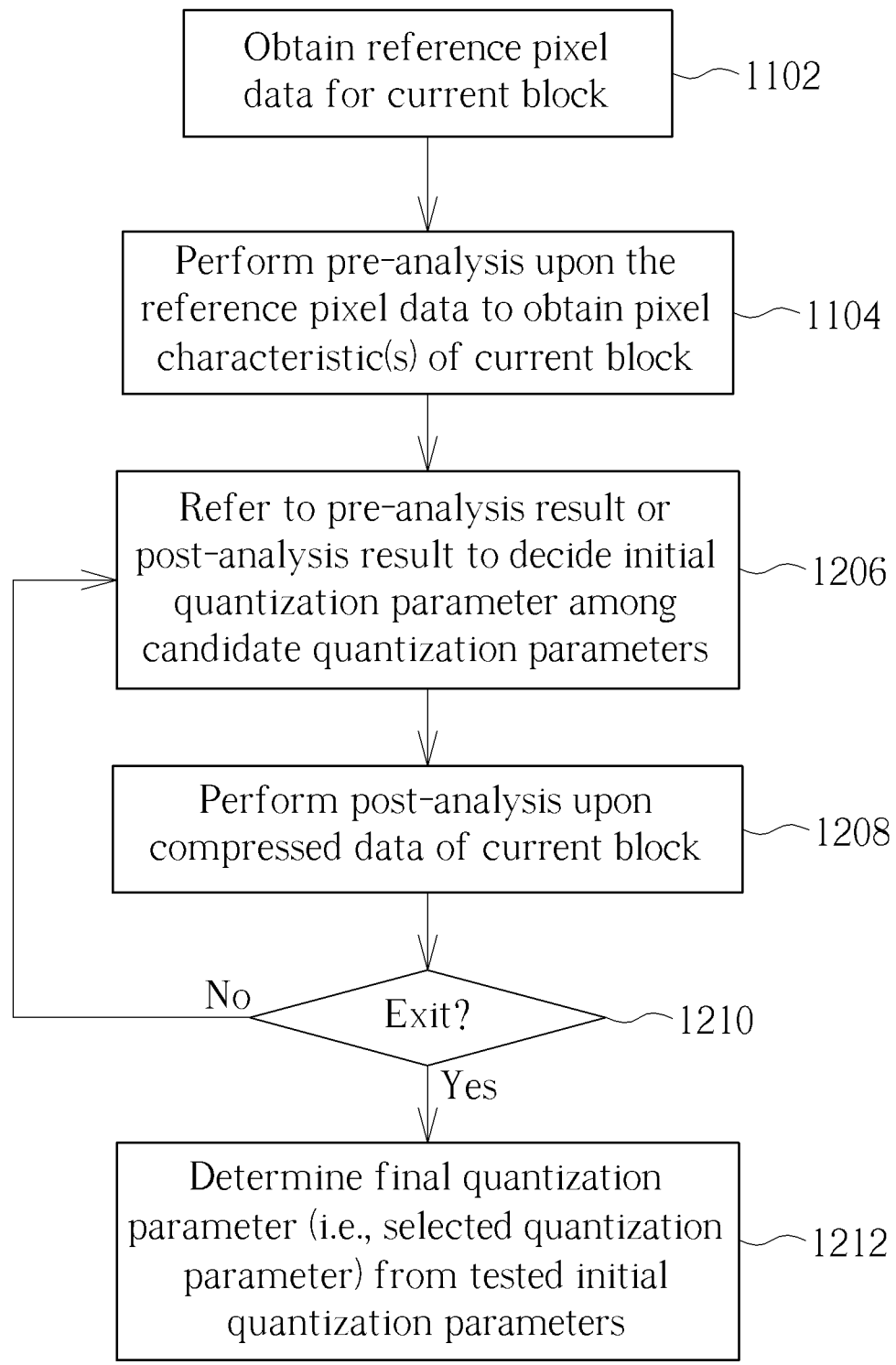
FIG. 12 is a flowchart illustrating a method of determining a selected quantization parameter for a block by using a multi-pass quantization parameter search.

FIG. 12 is a flowchart illustrating a method of determining a selected quantization parameter for a block by using a multi-pass quantization parameter search. In step 1206, the source quantization unit 104 refers to the pixel characteristic(s) (i.e., the pre-analysis result obtained in step 1104) to decide an initial quantization parameter from the candidate quantization parameters, and uses the initial quantization parameter to generate input pixel data of a current block to the lossless compression kernel 106. Hence, the lossless compression kernel 106 generates corresponding compressed data of the current block according to the input pixel data generated based on the initial quantization parameter. In step 1208, the source quantization unit 104 performs post-analysis upon the compressed data of the current block. In step 1210, the source quantization unit 104 determines whether the number of tested quantization parameters reaches a threshold value. It should be noted that the threshold value is a positive integer larger than one and smaller than the number of candidate quantization parameters. When it is determined that the number of tested quantization parameters does not reach the threshold value yet, the flow proceeds with step 1206 such that the source quantization unit 104 refers to the post-analysis result obtained in step 1208 to decide another initial quantization parameter. However, when it is determined that the number of tested quantization parameters reaches the threshold value, the flow proceeds with step 1212 such that the source quantization unit 104 determines a final quantization parameter (i.e., the selected quantization parameter) from these tested quantization parameters. More specifically, a candidate quantization parameter which makes corresponding compressed data of the block have a size meeting a bit budget requirement or have a minimum distortion induced by the source quantization operation with respect to the bit budget requirement is identified as the selected quantization parameter for the current block.

Figure 13:
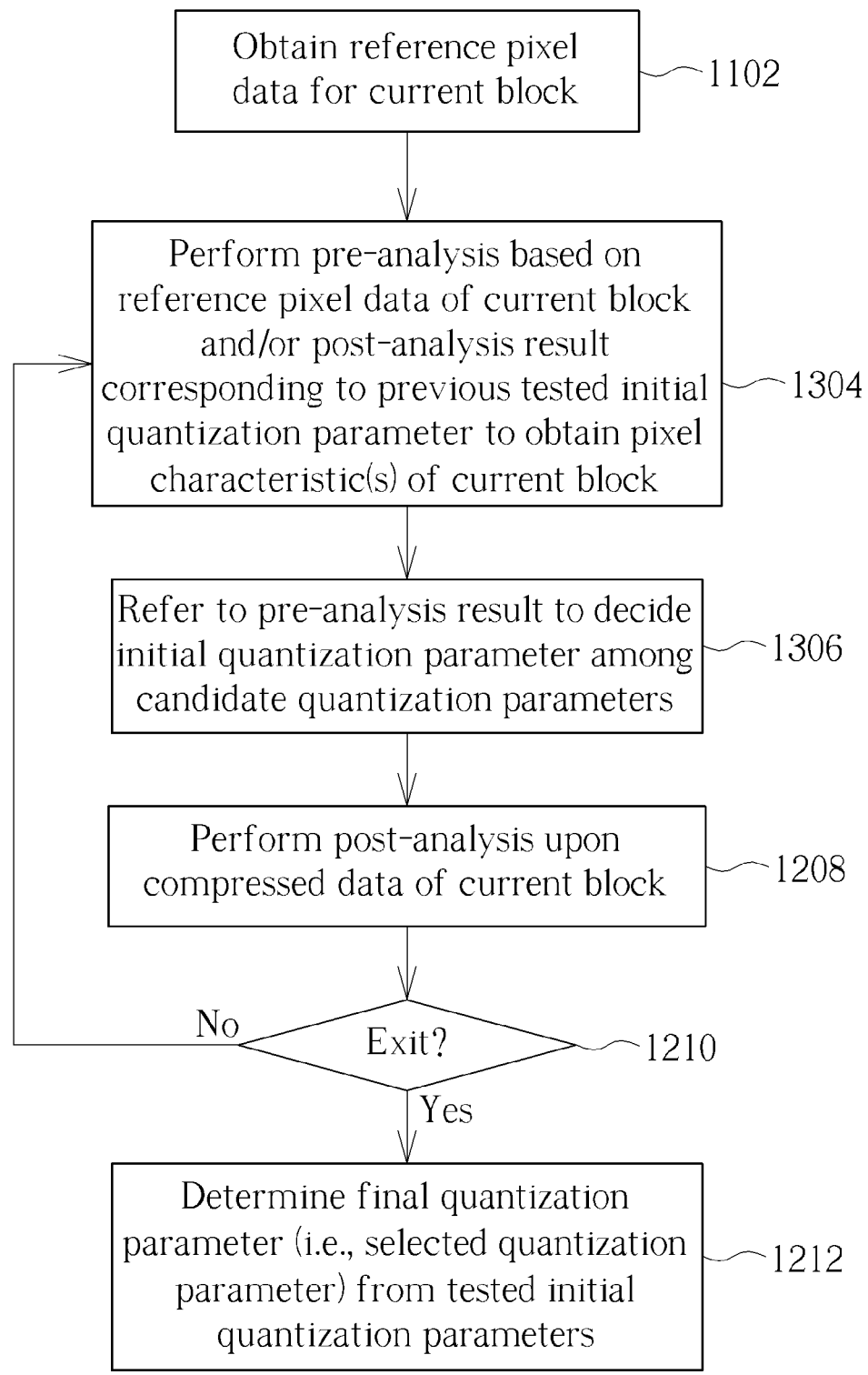
FIG. 13 is a flowchart illustrating another method of determining a selected quantization parameter for a block by using a multi-pass quantization parameter search.

FIG. 13 is a flowchart illustrating another method of determining a selected quantization parameter for a block by using a multi-pass quantization parameter search. The major difference between the flows shown in FIG. 12 and FIG. 13 is that step 1304 may further refer to the post-analysis result of the current block encoded using a previous tested initial quantization parameter to decide a current initial quantization parameter to be tested if the post-analysis result is available. Hence, step 1306 only refers to the pre-analysis result to decide an initial quantization parameter.

It should be noted that one of the aforementioned pre-analysis and post-analysis may be bypassed, depending upon application requirement. Besides, the selected quantization parameter of each of the blocks $BK_1$-$BK_N$ in the same frame Fm may be implicitly signaled or explicitly signaled. More specifically, when the selected quantization parameter is implicitly signaled, the selected quantization parameter is not encoded in the bit-stream Bs; and when the selected quantization parameter is explicitly signaled, the selected quantization parameter is encoded in the bit-stream Bs.

With regard to the multi-pass quantization parameter search shown in FIGS. 12-13, it is possible that the compressed data of the current data fails to meet the aforementioned bit budge requirement due to an incorrect quantization parameter predicted using the multi-pass quantization parameter search. When the multi-pass quantization parameter search is performed upon another block, the compressed data of the previous block is analyzed. In this way, the selected quantization parameter of a current block can be adjusted based on the previous encoding result to thereby reduce the mismatch between the compressed data size and an expected value. The same objective of making a size of compressed data of each frame generated under the lossy compression mode not exceed the predetermined bit budget $TH_{BB}$ is achieved.

As shown in FIG. 1, the image compressor 100 at the TX end (e.g., one chip) transmits the bit-stream Bs, which is composed of encoded/compressed pixel data of blocks $BK_1$-$BK_N$ of the frame Fm, to the image decompressor 110 at the RX end (e.g., another chip). Hence, the input port 112 of the image decompressor 110 is arranged for receiving compressed pixel data of the blocks $BK_1$-$BK_N$ of the frame Fm. The lossless decompression kernel 114 is arranged for performing a lossless decompression which may be regarded as an inverse operation of the lossless compression performed by the lossless compression kernel 106. The output inverse quantization unit 116 is arranged for performing an output inverse quantization operation which may be regarded as an inverse operation of the source quantization operation performed by the source quantization unit 104.

In this embodiment, an output of the lossless decompression kernel 114 may be directly processed by the output inverse quantization through the first path 117 or directly output through the second path (e.g., a bypass path) 118 without being processed by the output inverse quantization. More specifically, when a lossless decompression mode is enabled for the frame Fm, the lossless decompression kernel 114 performs the lossless decompression upon compressed pixel data of each of the blocks $BK_1$-$BK_N$ to generate output pixel data of each of the blocks $BK_1$-$BK_N$, and the output inverse quantization unit 116 bypasses the output pixel data of each of the blocks $BK_1$-$BK_N$ to an output port of the image decompressor 110. In this way, a reconstructed frame Fm' which is identical to the frame Fm is generated from the lossless decompression kernel 114 to act as a frame decoding output of the image decompressor 110. When a lossy decompression mode is enabled for the frame Fm, the lossless decompression kernel 114 performs the lossless decompression upon the compressed pixel data of each of the blocks $BK_1$-$BK_N$ to generate the output pixel data of each of the blocks $BK_1$-$BK_N$, and the output inverse quantization unit 116 performs the output inverse quantization upon the output pixel data of each of the blocks $BK_1$-$BK_N$. In this way, a reconstructed frame Fm' which may not be identical to the frame Fm is generated from the output inverse quantization unit 116 to act as a frame decoding output of the image decompressor 110. It should be noted that the lossless decompression kernel 114 is used under the lossless compression mode, and is reused under the lossy compression mode.

In one exemplary design, when the lossy compression is enabled by the image compressor 100, the quantization parameters $QP_{BK1}$-$QP_{BKN}$ of the blocks $BK_1$-$BK_N$ are also transmitted from the image compressor 100 to the image decompressor 110. Hence, when the lossy decompression mode is enabled by the image decompressor 110, the output inverse quantization unit 116 refers to each of the received quantization parameters $QP_{BK1}$-$QP_{BKN}$ to perform the output inverse quantization operation upon output pixel data of each of the blocks $BK_1$-$BK_N$. However, this is for illustrative purposes only, and is not meant to be a limitation of the present invention.

As mentioned above, the lossless decompression may be regarded as an inverse operation of the lossless compression, and the output inverse quantization may be regarded as an inverse operation of the source quantization. A person skilled in the art should readily understand details of the lossless decompression and the output inverse quantization after reading above paragraphs directed to the lossless compression and the source quantization. Thus, further description is omitted here for the sake of brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image compression method, comprising:
   receiving source pixel data of a plurality of blocks of a frame;
   when a lossless compression mode is enabled for the frame, utilizing an image compressor for bypassing a source quantization operation and applying a lossless compression kernel to source pixel data of each of the blocks; and
   when a lossy compression mode is enabled for the frame, utilizing the image compressor for applying the source quantization operation to the source pixel data of each of the blocks to generate input pixel data of each of the blocks, and applying the lossless compression kernel to the input pixel data of each of the blocks.

2. The image compression method of claim 1, wherein the lossless compression kernel includes a lossless symbol generation function and a lossless entropy coding function.

3. The image compression method of claim 1, wherein a size of compressed data of a plurality of blocks generated under the lossy compression mode does not exceed a predetermined bit budget.

4. The image compression method of claim 1, wherein the source quantization operation employs an adaptive quantization parameter for each of the blocks.

5. The image compression method of claim 4, wherein adaptive quantization parameters of the blocks are set to make a size of compressed data of a plurality of blocks generated under the lossy compression mode not exceed a bit budget.

6. The image compression method of claim 5, wherein the adaptive quantization parameter for each of the blocks is set by a selected quantization parameter among a plurality of candidate quantization parameters.

7. The image compression method of claim 6, wherein a full quantization parameter search is employed to use all of the candidate quantization parameters for generating input pixel data of a block, respectively, where a candidate quantization parameter which makes corresponding compressed data of the block have a size meeting a bit budget requirement and have a minimum distortion induced by the source quantization operation meeting the bit budget requirement is the selected quantization parameter.

8. The image compression method of claim 6, wherein a binary quantization parameter search is employed to use only a portion of the candidate quantization parameters for generating input pixel data of a block, respectively, where a candidate quantization parameter which makes corresponding compressed data of the block have a size meeting a bit budget requirement and have a minimum distortion induced by the source quantization operation meeting the bit budget requirement is the selected quantization parameter.

9. The image compression method of claim 6, wherein a one-pass quantization parameter search is employed to perform pixel data analysis to directly determine the selected quantization parameter for a block before input pixel data of the block is compressed.

10. The image compression method of claim 6, wherein a multi-pass quantization parameter search is employed to perform pixel data analysis to select a portion of the candidate quantization parameters for generating input pixel data of a block, respectively, where a candidate quantization parameter which makes corresponding compressed data of the block have a size meeting a bit budget requirement or have a minimum distortion induced by the source quantization operation with respect to the bit budget requirement is the selected quantization parameter.

11. An image compression method, comprising:
    receiving source pixel data of a plurality of blocks of a frame; and
    performing a lossy compression upon the frame by utilizing an image compressor for applying a source quantization operation to source pixel data of each of the blocks to generate input pixel data of each of the blocks, and applying a lossless compression kernel to the input pixel data of each of the blocks;
    wherein the source quantization operation employs an adaptive quantization parameter for each of the blocks.

12. The image compression method of claim 11, wherein the lossless compression kernel includes a lossless symbol generation function and a lossless entropy coding function.

13. The image compression method of claim 11, wherein adaptive quantization parameters of the blocks are set to make a size of compressed data of a plurality of blocks not exceed a bit budget.

14. The image compression method of claim 13, wherein the adaptive quantization parameter for each of the blocks is set by a selected quantization parameter among a plurality of candidate quantization parameters.

15. The image compression method of claim 14, wherein a full quantization parameter search is employed to use all of the candidate quantization parameters for generating input pixel data of a block, respectively, where a candidate quantization parameter which makes corresponding compressed data of the block have a size meeting a bit budget requirement and have a minimum distortion induced by the source quantization operation meeting the bit budget requirement is the selected quantization parameter.

16. The image compression method of claim 14, wherein a binary quantization parameter search is employed to use only a portion of the candidate quantization parameters for generating input pixel data of a block, respectively, where a candidate quantization parameter which makes corresponding compressed data of the block have a size meeting a bit budget requirement and have a minimum distortion induced by the source quantization operation meeting the bit budget requirement is the selected quantization parameter.

17. The image compression method of claim 14, wherein a one-pass quantization parameter search is employed to perform pixel data analysis to directly determine the selected quantization parameter for a block before input pixel data of the block is encoded.

18. The image compression method of claim 14, wherein a multi-pass quantization parameter search is employed to perform pixel data analysis to select a portion of the candidate quantization parameters for generating input pixel data of a block, respectively, where a candidate quantization parameter which makes corresponding compressed data of the block have a size meeting a bit budget requirement or have a minimum distortion induced by the source quantization operation with respect to the bit budget requirement is the selected quantization parameter.

19. The image compression method of claim 11, wherein when the adaptive quantization parameter for a block of the frame is set by a specific value, the source quantization operation is bypassed without modifying source pixel data of the block.

20. An image compressor, comprising:
an input port, arranged for receiving source pixel data of a plurality of blocks of a frame;
a source quantization circuit, arranged for performing a source quantization operation; and
a lossless compression circuit, arranged for performing a lossless compression;
wherein when a lossless compression mode is enabled for the frame, the source quantization circuit bypasses source pixel data of each of the blocks to the lossless compression circuit, and the lossless compression circuit performs the lossless compression upon the source pixel data of each of the blocks; and when a lossy compression mode is enabled for the frame, the source quantization circuit applies the source quantization operation to the source pixel data of each of the blocks to generate input pixel data of each of the blocks to the lossless compression circuit, and the lossless compression circuit performs the lossless compression upon the input pixel data of each of the blocks.

21. An image compressor, comprising:
an input port, arranged for receiving source pixel data of a plurality of blocks of a frame;
a source quantization circuit, arranged for applying a source quantization operation to source pixel data of each of the blocks to generate input pixel data of each of the blocks, wherein the source quantization operation circuit employs an adaptive quantization parameter for each of the blocks; and
a lossless compression circuit, arranged for performing a lossless compression upon the input pixel data of each of the blocks.

22. An image decompression method, comprising:
receiving compressed pixel data of a plurality of blocks of a frame;
when a lossless decompression mode is enabled for the frame, utilizing an image decompressor for applying a lossless decompression kernel to compressed pixel data of each of the blocks, and bypassing an output inverse quantization operation; and
when a lossy decompression mode is enabled for the frame, utilizing the image decompressor for applying the lossless decompression kernel to compressed pixel data of each of the blocks to generate output pixel data of each of the blocks, and applying the output inverse quantization operation to the output pixel data of each of the blocks.

23. The image decompression method of claim 22, wherein a size of compressed data of a plurality of blocks generated under a lossy compression mode does not exceed a predetermined bit budget.

24. An image decompression method, comprising:
receiving compressed pixel data of a plurality of blocks of a frame; and
utilizing an image decompressor for applying a lossless decompression kernel to compressed pixel data of each of the blocks to generate output pixel data of each of the blocks, and applying an output inverse quantization operation to the output pixel data of each of the blocks;
wherein the output inverse quantization operation employs an adaptive quantization parameter for each of the blocks.

25. The image decompression method of claim 24, wherein adaptive quantization parameters of the blocks are set to make a size of compressed data of a plurality of blocks not exceed a bit budget.

26. An image decompressor, comprising:
an input port, arranged for receiving compressed pixel data of a plurality of blocks of a frame;
a lossless decompression circuit, arranged for performing a lossless decompression; and
an output inverse quantization circuit, arranged for performing an output inverse quantization operation;
wherein when a lossless decompression mode is enabled for the frame, the lossless decompression circuit performs the lossless decompression upon compressed pixel data of each of the blocks to generate output pixel data of each of the blocks, and the output inverse quantization circuit bypasses the output pixel data of each of the blocks; and when a lossy decompression mode is enabled for the frame, the lossless decompression circuit performs the lossless decompression upon the compressed pixel data of each of the blocks to generate the output pixel data of each of the blocks, and the output inverse quantization circuit performs the output inverse quantization upon the output pixel data of each of the blocks.

27. The image decompressor of claim 26, wherein a size of compressed data of a plurality of blocks generated under a lossy compression mode does not exceed a predetermined bit budget.

28. An image decompressor, comprising:
an input port, arranged for receiving compressed pixel data of a plurality of blocks of a frame;
a lossless decompression circuit, arranged for performing a lossless decompression upon compressed pixel data of each of the blocks to generate output pixel data of each of the blocks; and
an output inverse quantization circuit, arranged for performing an output inverse quantization operation upon the output pixel data of each of the blocks;
wherein the output inverse quantization circuit employs an adaptive quantization parameter for each of the blocks.

29. The image decompressor of claim 28, wherein adaptive quantization parameters of the blocks are set to make a size of compressed data of a plurality of blocks not exceed a bit budget.

* * * * *